United States Patent [19]

Gordon et al.

[11] Patent Number: 5,067,173

[45] Date of Patent: Nov. 19, 1991

[54] MICROCELLULAR COMMUNICATIONS SYSTEM USING SPACE DIVERSITY RECEPTION

[75] Inventors: Alexander Gordon, Rutherford; George P. Vella-Coleiro, Summit, both of N.J.

[73] Assignee: AT&T Bell Laboratories, Murray Hill, N.J.

[21] Appl. No.: 630,674

[22] Filed: Dec. 20, 1990

[51] Int. Cl.⁵ .................. H04B 1/00; H04M 11/00
[52] U.S. Cl. ............................ 359/152; 455/33; 455/139; 455/275; 359/167; 359/173
[58] Field of Search ............ 455/617, 33, 54, 137, 455/273, 275, 139, 607, 609, 606, 610, 612; 379/59, 60; 343/844

[56] References Cited

U.S. PATENT DOCUMENTS

| | | | |
|---|---|---|---|
| 4,156,873 | 5/1979 | Moore | 455/137 |
| 4,748,682 | 5/1988 | Fukae et al. | 455/137 |
| 4,850,037 | 7/1989 | Bochmann | 455/137 |
| 4,939,791 | 7/1990 | Bochmann et al. | 455/137 |

FOREIGN PATENT DOCUMENTS 0143854 11/1980 Japan ................... 455/617

*Primary Examiner*—Curtis Kuntz
*Assistant Examiner*—Kinfe-Michael Negash
*Attorney, Agent, or Firm*—Maurice de Picciotto

[57] ABSTRACT

Microcellular stations are transceiving units covering a relatively small geographic area and adapted to establish bidirectional links between mobile telephone subscriber stations and a main base station. Each such microcellular station includes a transmitter for generating outgoing signals directed to the main base station over an optical fiber link. Radio signals received from a mobile station at a separate diversity antenna of the microcellular station are frequency shifted and combined with other signals received from the mobile station. The transmitter at the microcellular station generates an optical carrier signal which is modulated by the resulting combined signals. A frequency converter, located at the main base station, restores the frequency band of signals received from the microcellular station to its original frequency. Frequency shifting and conversion are implemented at the microcellular station and at the main base station by frequency mixing steps performed by oscillators at both locations, which oscillators use the same reference frequency thereby achieving channel coherency.

15 Claims, 3 Drawing Sheets

MICROCELLULAR COMMUNICATIONS SYSTEM USING SPACE DIVERSITY RECEPTION

TECHNICAL FIELD

The present invention generally relates to microcellular communications systems and, more particularly, to techniques for processing radio signals at a radio reception and transmission microcellular site using space diversity.

BACKGROUND OF THE INVENTION

In high capacity cellular mobile radiotelephone systems, a plurality of base stations, also referred to as cell sites, are arranged so that each cell site covers a respective geographical area called a cell. Typically, each such cell site contains a radio transmitter-receiver and is directly wired to a mobile telephone switching office (MTSO) which in turn is part of a regional or nationwide network of telephone switching offices. One example of such cell site is the AT&T Series I cell sites (Model 1 and Model 2 architecture) used in the family of AUTOPLEX ® cellular telecommunications systems which are commercially available from the American Telephone and Telegraph Company of New York, N.Y. Because of increased demands for more radio channels resulting from a growing cellular customers base, cellular telephone service providers often desire to expand their networks to service an increasing number of subscriber stations within a geographical location.

Various solutions to meet the foregoing need have suggested placing microcell sites geographically very close to the potential locations of mobile or portable subscriber stations and carrying signals between the main cell site and its remote microcell sites over coaxial transmission lines, microwave links or an optical fiber cable network interconnecting the main cell site and its associated microcell sites. One such microcellular communications system including optical fiber connections between a main base station and a plurality of radio frequency antennas is described in copending U.S. patent application Ser. No. 333,490 of T. Chu and M. J. Gans filed Apr. 4, 1989 and assigned to the same assignee. Another such microcellular communications system using a microwave link between a main base station and a plurality of remote microcell stations is described in copending U.S. patent application Ser. No. 557,873 of J. E. Russell and G. I. Zysman, filed July 25, 1990 and assigned to the same assignee.

Although such systems operate satisfactorily for their intended purposes, the effect of Rayleigh fading upon signal quality is worse at the microcell scale than at the normally larger cell area. Furthermore, as a mobile station moves within a relatively small microcell area, building or terrain obstructions and other radio signal propagation impediments often cause degradation of transmission between the mobile station and the microcell station resulting in termination of the call in progress.

Space diversity techniques have been proposed at the cell site level to overcome and solve the foregoing problems. However, such known techniques typically add significant complexity and cost to the cell site, as well as to the mobile units. Therefore, there exists a need for a reliable, reasonably priced and relatively easily implementable technique for processing radio signals using space diversity at the microcell level.

SUMMARY OF THE INVENTION

The foregoing need is met in an embodiment of the invention wherein a microcell communications station exhibiting receive space diversity comprises a first and a second antenna for each receiving radio signals in a predetermined range of radio frequencies; frequency conversion means coupled to the second antenna for shifting the frequency range of signals received at the second antenna; combining means coupled to the first antenna and the frequency conversion means for generating combined signals in two different frequency bands; and means coupled to the combining means for generating a carrier signal modulated by the combined signals.

In accordance with another embodiment, a method for processing radio signals at a microcell communications station comprises the steps of receiving at the microcell station first and second radio signals having respective frequencies within a first range of frequencies; shifting the frequency range of the received second radio signals to generate third radio signals having frequencies within a second range of frequencies; combining the first radio signals and the third radio signals to generate combined signals having frequencies in the first and second ranges of frequencies; and modulating the combined signals on a carrier signal.

In accordance with a preferred embodiment, a microcell mobile radio communications station exhibiting receive space diversity comprises a first antenna for receiving radio signals in a first range of radio frequencies; a second antenna for receiving radio signals in the first range of radio frequencies; frequency conversion means coupled to the second antenna for reducing the frequency range of signals received at the second antenna; combining means coupled to the first antenna and the frequency conversion means for generating combined signals in two different frequency bands; and a laser transmitter coupled to the combining means for generating an optical wavelength carrier signal modulated by the combined signals.

In accordance with a still further embodiment, a microcellular communications system comprises a first antenna for receiving radio signals in a first range of radio frequencies; a diversity antenna for receiving radio signals in the first range of radio frequencies; frequency down conversion means coupled to the diversity antenna for reducing the frequency range of signals received at the diversity antenna; combining means coupled to the first antenna and the frequency conversion means for generating combined signals in two different frequency bands; a laser transmitter coupled to the combining means for generating an optical wavelength carrier signal modulated by the combined signals; and an optical transmission path coupled to the laser transmitter for transmitting the optical carrier signal to a remote cellular base station.

BRIEF DESCRIPTION OF THE DRAWING

Further features and advantages of the present invention will become apparent from the following detailed description taken together with the drawings in which.

DETAILED DESCRIPTION

Figure 1:
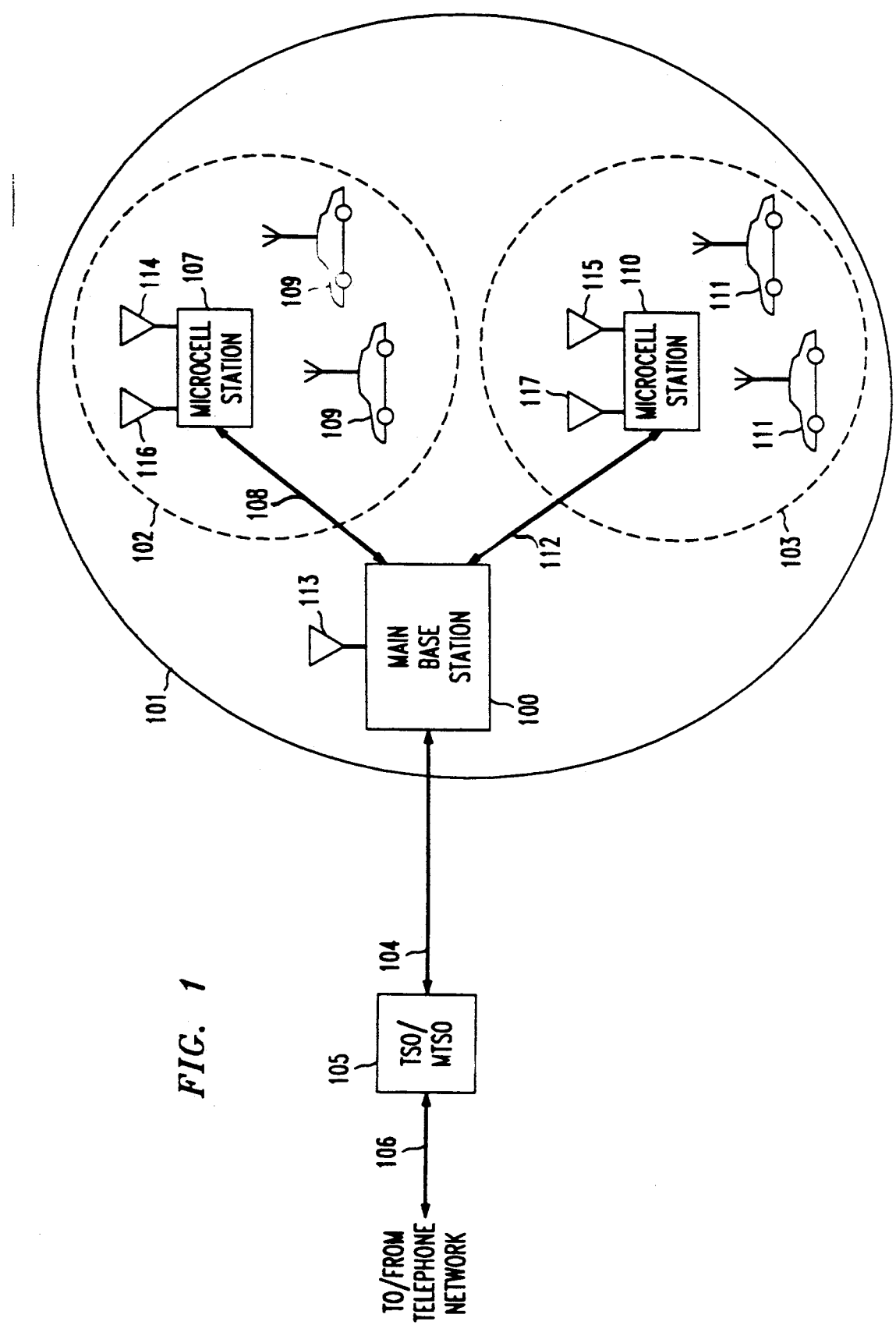
FIG. 1 is an illustrative configuration of a system comprising a main base station and several microcellular stations in accordance with an embodiment of the invention.

Shown in FIG. 1 is a schematic illustration of a microcellular communications system in accordance with an embodiment of the invention comprising a main base station 100 adapted to transmit and receive signals to and from a main cell area 101, as well as communicate with various smaller geographical areas or regions, such as microcell regions 102 and 103. The main base station 100 is coupled, via a communication link 104, to a telephone switching office 105, for example, an MTSO of a commercially available type. The telephone switching office 105 is in turn connected, via another communication link 106, to the public telephone network. Located within the microcell region 102 is a microcell station 107 designed to communicate with the main base station 100 over a bidirectional transmission path 108, and to transmit and receive radio signals to and from a plurality of subscriber stations located within the microcell region 102, such as mobile stations 109. Similarly, the microcell region 103 includes a microcell station 110 also adapted to communicate with the main base station 100 over another bidirectional transmission path 112, and to transmit and receive radio signals to and from a plurality of subscriber mobile stations 111.

In order to establish bidirectional radio communication links between the main base station 100 and mobile stations within the cell area 101, the main base station 100 comprises at least one antenna 113 which is adapted to transmit and receive signals to and from such mobile stations. Alternatively, the main base station 100 may comprise two antennas (not shown) instead of the antenna 113, one designed as a transmitting antenna and the other as a receiving antenna. Similarly, each microcell station 107 and 110 includes at least one radio frequency antenna 114 and 115, respectively. The antenna 114 is used to establish a bidirectional radio link between the microcell station 107 and its associated mobile stations 109 to be served within the microcell region 102. Alternatively, the microcell station 107 may include separate transmitting and receiving antennas (not shown) instead of the antenna 114. The antenna 115 is used to establish radio communication links between the microcell station 110 and the mobile stations 111 to be served within the microcell region 103. As mentioned above, the antenna 115 may also be replaced by two antennas (not shown), one designed as a transmitting antenna and the other as a receiving antenna.

In accordance with an embodiment of the invention, each microcell station 107 and 110 comprises a second radio frequency antenna 116 and 117, respectively, spaced from the antenna 114 and 115 at the associated microcell station. The antennas 116 and 117 will hereafter be referred to as diversity antennas.

Figure 2:
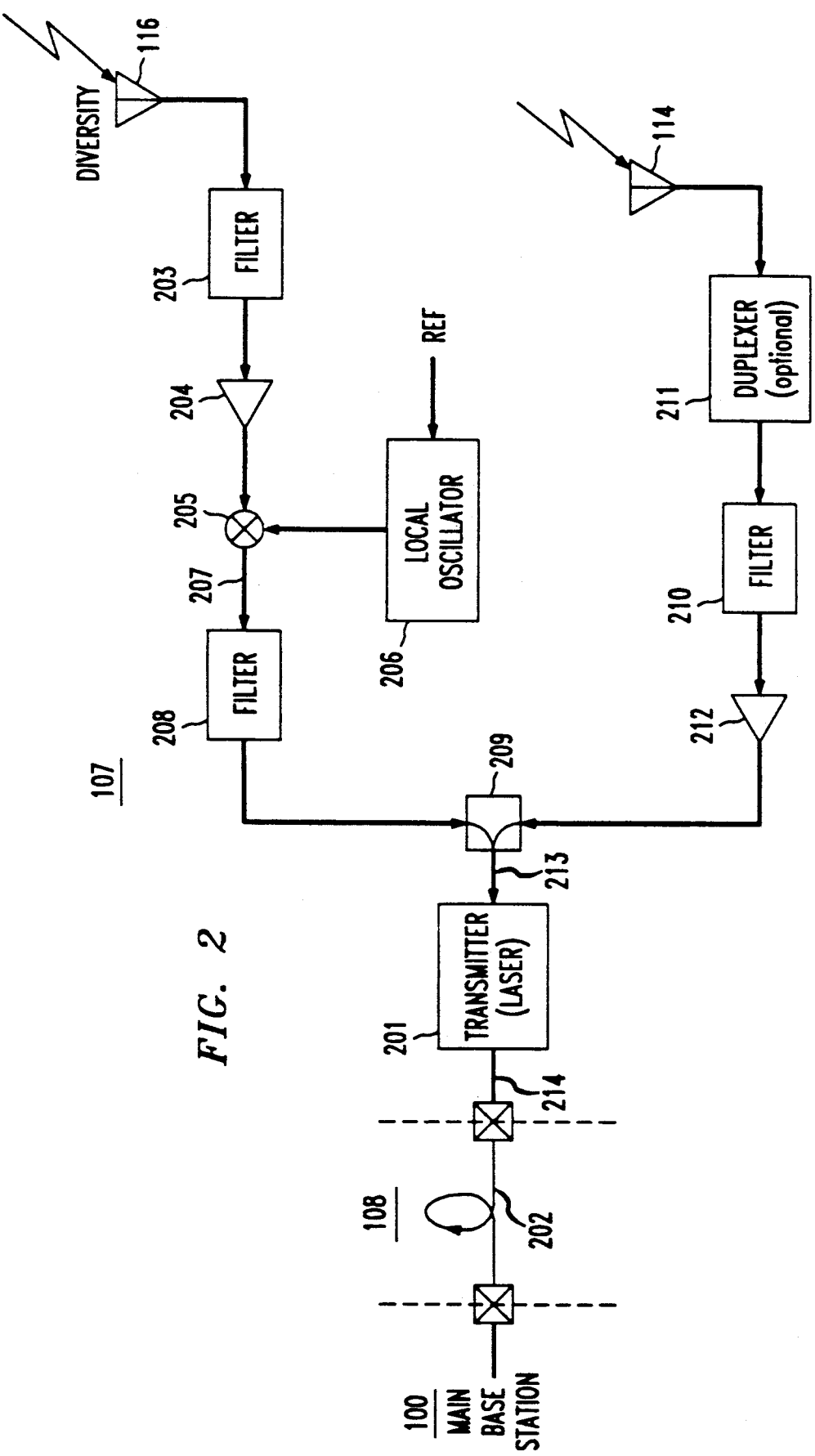
FIG. 2 is a functional block diagram representation of certain aspects of a microcellular station in accordance with an illustrative embodiment of the invention.

Referring now to FIG. 2, there is shown, in functional block diagram form, only certain portions of the microcell station 107 useful in the understanding of an illustrative embodiment of the invention. The microcell station 107 comprises at least two antennas, namely the radio frequency antenna 114 and the diversity antenna 116. If diversity reception were to be implemented in accordance with known techniques, a separate receive channel would be required including an additional specially dedicated transmitter and a separate transmission path to couple the diversity receive signals to the remote main base station 100. Such a separate receive channel would yield substantially increased cost and complexity to the system. Instead, in accordance with an embodiment of the invention, diversity reception is achieved using only a single transmitter 201 and a single optical fiber 202.

As shown in FIG. 2, radio signals are received at both antennas 114 and 116. Signals received at the diversity antenna 116 are coupled to a filter 203 and then to an amplifier 204. The amplified diversity receive signals are fed into a mixing circuit 205 where the frequency band of the diversity receive signals is shifted to a different band of frequencies. The mixing circuit 205 receives a second signal from a local oscillator 206 having a frequency selected to minimize the generation of unwanted mixing products, such as harmonic and/or intermodulation products, within the microcell station receive band. The frequency converted signals present on lead 207 are filtered by means of a filter circuit 208 and then coupled to one input terminal of a combining circuit 209.

The radio signals received at the other antenna 114 are filtered by means of a filter circuit 210 having the same characteristics as the filter 203 in the diversity receive portion of the microcell station 107. Shown in FIG. 2 is an optional duplexer circuit 211 interposed between the antenna 114 and the filter circuit 210. The duplexer 211 is needed only if the antenna 114 is operating as a receiving, as well as, a transmitting antenna. The output signals of filter 210 are coupled to an amplifier circuit 212 which is used to bring the receive band to the same level as the diversity band. The amplified output signals of amplifier 212 are coupled to another input terminal of the combining circuit 209. The combined output signals present on lead 213 exhibits two different frequency bands, namely a shifted frequency diversity portion and a regular frequency receive portion. In accordance with an embodiment of the invention, the combined signals present on lead 213 are coupled to a single transmitter 201, preferably a laser transmitter, capable of generating, on output lead 214, an outgoing optical carrier signal modulated by the combined signals. The carrier signal is next coupled to an optical fiber transmission line 202 which is part of the communication path 108.

Figure 3:
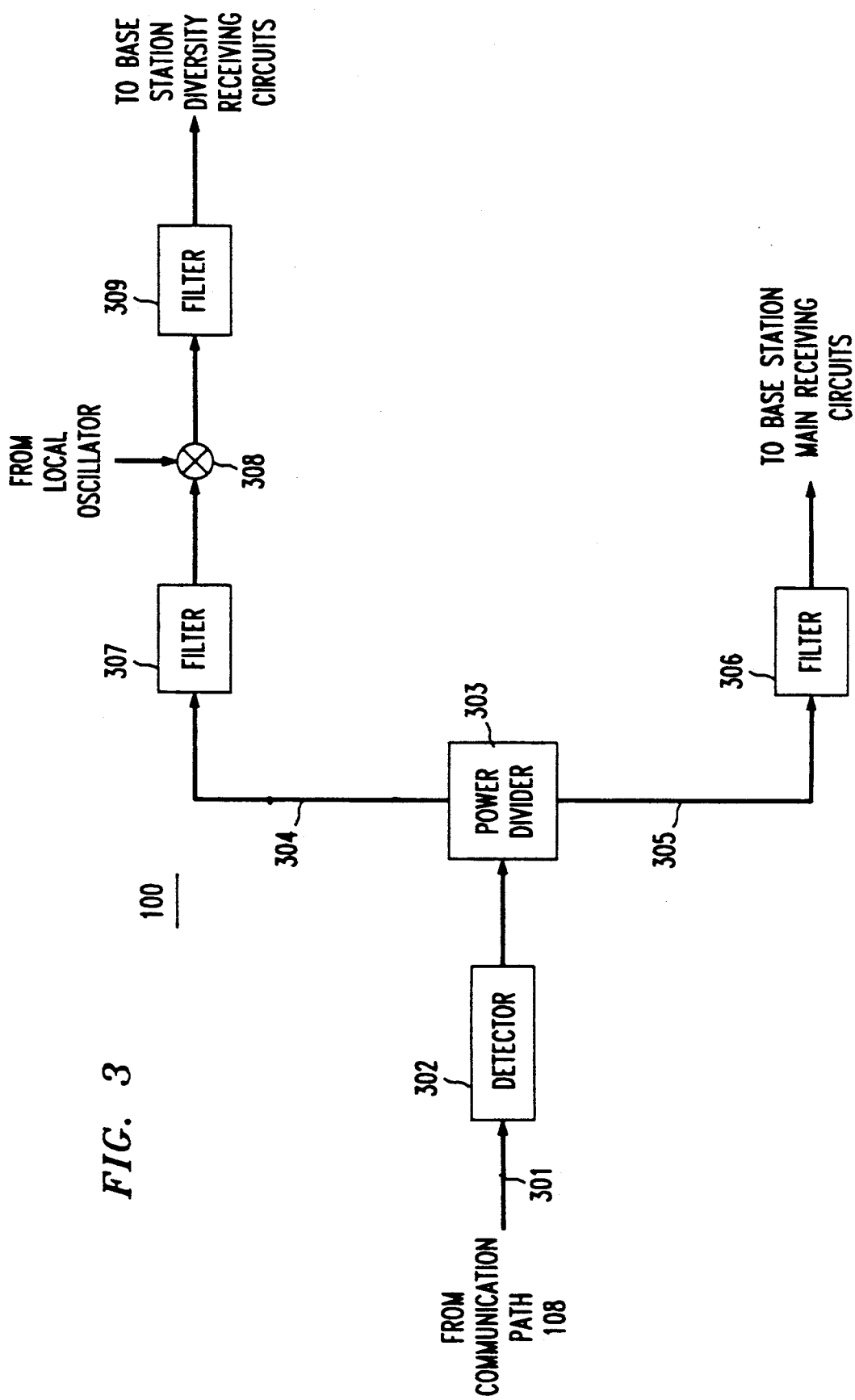
FIG. 3 is a functional block diagram representation of certain aspects of a main base station in accordance with another illustrative embodiment of the invention.

Shown in FIG. 3 are only certain portions of the main base station 100 where signals from the communication path 108 are received on incoming lead 301. Such signals are first demodulated by means of a detector circuit 302, and next coupled to a power divider circuit 303 adapted to generate two output signals on its output leads 304 and 305. The signals present on lead 305 are coupled to a filter circuit 306 having substantially the same filtering characteristics as those of the filter circuit 210 of the microcell station 107 in FIG. 2. The other signals present on lead 304 are first coupled to a filter circuit 307 having substantially the same filtering characteristics as those of the filter circuit 208 of the microcell station 107 in FIG. 2. A mixing circuit 308, similar to the mixing circuit 205 of the microcell station 107, is coupled to the filter circuit 307 to frequency shift the filtered output signals of the filter circuit 307. In accordance with an embodiment of the invention, the frequency shifting comprises a frequency up conversion to a frequency band of the order of the band received at the diversity antenna 116 of the microcell station 107. A filter circuit 309 coupled to the mixing circuit 308, has substantially the same filtering characteristics as those of the filter circuit 203 of the microcellular station 107.

In connection with a specific example directed to the field of cellular mobile radiotelephone systems, the radio signals received at the antenna 114 and the diversity antenna 116 are in a frequency band of 824 MHz to 850 MHz. The filter circuits 203 and 210 are bandpass filters having a center frequency of the order of 836.5 MHz. The combined effect of the local oscillator 206 and the mixing circuit 205 results in the frequency down conversion of the signals which are present on lead 207 to a new lower band of 701 MHz to 727 MHz. The filter circuit 208 is a bandpass filter having a center frequency of the order of 713 MHz and a 30 MHz bandwidth.

In accordance with an illustrative embodiment, the selection of the frequency of the local oscillator 206 and of its reference frequency on its REF input requires consideration of several factors. Normally, the local oscillator frequency feeding a mixing circuit would be above the input frequency band, i.e., 824 MHz to 850 MHz in the above example, in order to avoid the normal mixing products generated by the mixing circuit 205. However, this would require using an oscillator having a frequency of the order of 1500 MHz. Such a selection would yield a power consumptive and expensive oscillator. On the other hand, the down converted diversity channel band should be close enough to the original band of the received signals but spaced so as to allow a 70 dB rejection by a relatively inexpensive filter 208.

Any mixing action implies the generation of many mixing products which are a result of multiplying two sine waves in a nonlinear element. The resulting components are described by $mF_1 \pm nF_0$, where $F_1$ is the frequency of the local oscillator 206, $F_0$ is the incoming frequency, and m and n are integers whose value can go up to 20 or more. Since all mixing is performed inside nonlinear elements, the amplitude of the mixing products are distributed as a sum of a power series. Those products which are detrimental to the integrity of the band must be low enough so as not to interfere with the lowest incoming signals. Although all intermodulation products are basically unwanted, a distinction must be made when a single RF carrier input is mixed with a Local Oscillator (LO) for down or up conversion and successive filtering amplification of the intermediate frequency IF. In such case, only the $(mF_1 \pm nF_0)$ components within the IF bandwidth will be of significance and must be identified and evaluated. On the other hand, in the case when many RF carriers closely spaced within the band are mixed with a single Local Oscillator (LO), in addition to the unwanted harmonic and/or intermodulation products of the foregoing case, a large number of in band products which are close by because of the close spacing of the individual RF carriers are generated. The $nF_0$ term is now replaced by $n[F_{01} + F_{02} + \ldots F_{0n}]$ producing components such as $[F_{01} \pm 2F_{02}]$, $[(F_{01} + F_{02}) - F_{03}]$ etc. These products are difficult to filter out since they are in band. They can be alleviated to some degree by an increase in LO power, or reduction in input level of $F_{01}$ to $F_{0n}$.

Due to the typical 30 kHz channel spacing of all incoming RF carriers, the internal products will also tend to be spaced in multiples of 30 kHz and, if not suppressed by 70 dB or more, will tend to desensitize other receive channels within the band. Furthermore, the complete conversion must cover both cellular service provider channels and therefore encompasses a 26 MHz bandwidth. The frequency of the local oscillator 206 was selected in the order of 123 MHz which resulted in both up conversion, when used at the main base station 100, and down conversion at the microcell station 107, substantially free of any spurs. Also, a preferred and advantageous reference locking frequency signal at 15 MHz was used.

Although the present invention has been described in connection with particular embodiments thereof, additional embodiments, modifications and applications which will be apparent to those skilled in the art are included within the spirit and scope of the invention.

We claim:

1. A microcell communications station exhibiting receive space diversity comprising:
   a first and a second antenna for each receiving radio signals in a predetermined range of radio frequencies;
   frequency conversion means coupled to the second antenna for shifting the frequency range of signals received at the second antenna;
   combining means coupled to the first antenna and the frequency conversion means for generating combined signals in two different frequency bands; and
   means coupled to the combining means for generating a carrier signal modulated by the combined signals.

2. A microcell communications station according to claim 1, wherein the frequency conversion means comprises a frequency down converter including a mixer and a local oscillator having a frequency selected to substantially reduce unwanted mixing products within the microcell station predetermined range of receive radio frequencies.

3. A microcell communications station according to claim 2, wherein the frequency of the local oscillator is substantially below the frequency band of the receive radio signals.

4. A microcell communications station according to claim 1, wherein the carrier signal generating means comprises a single laser transmitter for generating an optical wavelength signal.

5. Method for processing radio signals at a microcell communications station comprising the steps of:
   receiving at the microcell station first and second radio signals having respective frequencies within a first range of frequencies;
   shifting the frequency range of the received second radio signals to generate third radio signals having frequencies within a second range of frequencies;
   combining the first radio signals and the third radio signals to generate combined signals having frequencies in the first and second ranges of frequencies; and
   modulating the combined signals on a carrier signal.

6. Method according to claim 5, wherein the shifting step comprises the step of down converting the frequency of the second radio signals so that the second range of frequencies is lower than the first range of frequencies.

7. Method according to claim 6, wherein the down converting step comprises the step of mixing the received second radio signals with a signal generated by a local oscillator having a frequency substantially below the frequency band of the receive radio signals.

8. Method according to claim 7, comprising the step of selecting the frequency of the local oscillator to substantially reduce unwanted mixing products within the band of the receive radio signals.

9. A microcell mobile radio communications station exhibiting receive space diversity comprising:
   a first antenna for receiving radio signals in a first range of radio frequencies;
   a second antenna for receiving radio signals in the first range of radio frequencies;
   frequency conversion means coupled to the second antenna for reducing the frequency range of signals received at the second antenna;
   combining means coupled to the first antenna and the frequency conversion means for generating combined signals in two different frequency bands; and
   a laser transmitter coupled to the combining means for generating an optical wavelength carrier signal modulated by the combined signals.

10. A microcell mobile radio communications station according to claim 9, wherein the frequency conversion means comprise:
    a high level termination-insensitive mixing circuit; and
    a local oscillator coupled to the mixing circuit and having a frequency selected to substantially reduce unwanted mixing products within the range of the receive radio signals.

11. A microcell mobile radio communications station according to claim 10, wherein the frequency of the local oscillator is substantially below the frequency band of the receive radio signals.

12. A microcellular communications system comprising:
    a first antenna for receiving radio signals in a first range of radio frequencies;
    a diversity antenna for receiving radio signals in the first range of radio frequencies;
    frequency down conversion means coupled to the diversity antenna for reducing the frequency range of signals received at the diversity antenna;
    combining means coupled to the first antenna and the frequency conversion means for generating combined signals in two different frequency bands;
    a laser transmitter coupled to the combining means for generating an optical wavelength carrier signal modulated by the combined signals; and
    an optical transmission path coupled to the laser transmitter for transmitting the optical carrier signal to a remote cellular base station.

13. A microcellular communications system according to claim 12, wherein the remote cellular base station includes frequency up conversion means for increasing the frequency range of the signals received over the optical transmission path to the first range of radio frequencies.

14. A microcellular communications system according to claim 13, wherein the frequency down conversion means and the frequency up conversion means each includes a mixing circuit and a local oscillator using the same reference frequency.

15. A cellular communications base station comprising:
    input means adapted to receive signals in two different frequency bands from a remote cellular base location;
    detecting means coupled to the input means for demodulating the received signals;
    means coupled to the detecting means for dividing the demodulated signals into two separate signals;
    frequency shifting means coupled to the dividing means for increasing the frequency range of one of said separate signals;
    first filtering means coupled to the frequency shifting means for filtering the frequency-increased separate signals; and
    second filtering means coupled to the dividing means for filtering the other separate signal.

* * * * *